United States Patent [19]
Cordell et al.

[11] Patent Number: 5,778,372
[45] Date of Patent: Jul. 7, 1998

[54] REMOTE RETRIEVAL AND DISPLAY MANAGEMENT OF ELECTRONIC DOCUMENT WITH INCORPORATED IMAGES

[75] Inventors: John Palmer Cordell; Christopher Matthew Franklin, both of Bellevue, Wash.

[73] Assignee: Microsoft Corporation, Redmond, Wash.

[21] Appl. No.: 634,380

[22] Filed: Apr. 18, 1996

[51] Int. Cl.$^6$ ........................................... G06F 17/30
[52] U.S. Cl. ........................ 707/100; 707/513; 707/104
[58] Field of Search .......................... 395/610, 77, 93; 707/10, 513, 104

[56] References Cited

U.S. PATENT DOCUMENTS

| | | |
|---|---|---|
| 5,446,740 | 8/1995 | Yien et al. ........................ 395/200.77 |
| 5,493,677 | 2/1996 | Balogh et al. ........................ 707/104 |
| 5,499,330 | 3/1996 | Lucas et al. ........................ 707/514 |
| 5,528,739 | 6/1996 | Lucas et al. ........................ 707/526 |
| 5,530,852 | 6/1996 | Meske, Jr. et al. ............. 395/200.36 |
| 5,537,526 | 7/1996 | Anderson et al. ................. 707/515 |
| 5,544,051 | 8/1996 | Senn et al. ............................ 707/3 |
| 5,572,643 | 11/1996 | Judson ........................ 395/200.48 |
| 5,621,874 | 4/1997 | Lucas et al. ........................ 395/761 |
| 5,623,652 | 4/1997 | Vora et al. ........................ 395/610 |
| 5,625,818 | 4/1997 | Zarmer et al. ........................ 395/615 |
| 5,649,186 | 7/1997 | Ferguson ........................ 395/610 |
| 5,659,729 | 8/1997 | Nielsen ........................ 395/603 |

OTHER PUBLICATIONS

Lemay. Teach Yourself Web Publishing with HTML 3.0 in a Week, Sams Publishing, Dec. 7, 1995.

*Primary Examiner*—Wayne Amsbury
*Attorney, Agent, or Firm*—Klarquist Sparkman Campbell Leigh & Whinston, LLP

[57] ABSTRACT

A browser remotely retrieves electronic documents from a remote computer network for viewing by a user. For enhancing responsiveness, the browser initially displays an electronic document without a background image so that the electronic document is initially displayed more quickly. The browser also prioritizes downloading of embedded images of the document by their incorporation in the currently visible portion of the electronic document. Further, the browser dynamically creates additional connections for retrieving resources incorporated into the electronic document from the remote computer network.

19 Claims, 6 Drawing Sheets

REMOTE RETRIEVAL AND DISPLAY MANAGEMENT OF ELECTRONIC DOCUMENT WITH INCORPORATED IMAGES

FIELD OF THE INVENTION

This invention relates generally to managing retrieval and display of electronic documents from a remote computer network by a browser software to enhance perceived responsiveness, and in particular for electronic documents having text, background images, and embedded images.

BACKGROUND AND SUMMARY OF THE INVENTION

Software, generally known as "Internet browsers," are now in wide-spread use for retrieving (also known as "downloading") and viewing electronic documents in hyper-text markup language (HTML) format from a portion of the Internet known as the "world-wide web." Examples of currently available browsers include the Internet Explorer by Microsoft Corporation, the Navigator by Netscape Communications Corporation, Mosaic by the National Center for Supercomputing Applications, and others. These HTML documents are ASCII coded (a well known standard for coding alpha-numeric characters in 7- or 8-bits) character files generally consisting of text and HTML "tags" which specify formatting of the document, links (referred to as "hyper-links") to related documents, and other files that contain information (e.g., sound, images, video, etc.) which is to be combined into the document, among other tag features. Typical HTML documents found on the world wide web include both text and tags specifying files for several images that are to be displayed with the text.

The Internet is a well known, global network of cooperatively interconnected computer networks. The world-wide web portion of the Internet is a collection of server computers (referred to as "sites") on the Internet which store HTML documents that can be publicly accessed by computer users having a connection to the Internet. There are many such world wide web sites on he Internet.

Individual computer users commonly connect to the Internet over a conventional analog telephone line (sometimes referred to as a "POTS" line) with a modem. These users dial with the modem on the public telephone system to a server computer connected on the Internet, such as a server computer of an Internet access service provider with which the user has an account. Currently available modems typically are capable of communicating at speeds of approximately 14.4 kbit/second and 28.8 kbit/second. Some computer users access the Internet over faster telephone lines, such as ISDN, Ti, or like telephone lines, and are able to obtain communications speeds that are four or more times faster than with modems and conventional analog "POTS" telephone lines.

Typical HTML documents on the world-wide web often are several tens of thousands of bytes and often incorporate several image files that also are several tens of thousands of bytes each. At the 28.8 kbit/second speed commonly used for connecting to the Internet, such typical HTML documents (with the image files they incorporate) can take from tens of seconds to minutes to download completely. For example, a 20-kbyte HTML document that incorporates five 35-kbyte images would take approximately six seconds for downloading the document and about ten seconds for downloading each of the images at that speed (assuming the modem's full bandwidth could be utilized for the data). Further, the latency of the Internet adds an additional time delay (e.g., a couple of seconds or more depending on the current load of the Internet and the particular site from which the document is being downloaded) between requesting each of the document and images and when the document or images begins arriving at the user's computer.

In use, browser software allows a user to navigate (also known as "browsing") between documents and sites on the world-wide web. The user can enter a name of a document, referred to as a uniform resource locator ("URL"), which specifies a particular site and a particular resource or file at that site containing the document for the browser to retrieve. Alternatively, the user can activate a "hyper-link" on an HTML document currently being viewed to retrieve a related document (as specified by a URL in the hyper-link tag within the current HTML document). This causes the browser to jump or change its display to the new document specified by the hyper-link's URL.

A typical prior Internet browser is the Netscape Navigator (hereafter "Navigator"). When the user moves to a URL for a new HTML document (e.g., from activating a hyper-link), the Navigator first creates a connection to the site where the HTML document identified by the URL resides on the Internet and requests the HTML document over the connection. After then receiving the HTML document in response to its request, the Navigator parses the HTML document for tags that specify URLs for images and other additional files that are to be incorporated into the HTML document. Where the HTML document specifies a URL of a background image, the Navigator requests the background image and waits for the background image to arrive before displaying the HTML document. Once the background image is received, the Navigator then draws an initial display of the HTML document (e.g., by generating and writing display data to a display buffer or display device).

If the HTML document also contains tags for other images to be incorporated into the HTML document, the Navigator requests these images in the order that the tags appear in the document. If more than one image is incorporated in the HTML document, the Navigator requests all the images without waiting until the images are received. This causes the images to download concurrently from their site on the Internet, which divides the data communications bandwidth between the downloading images. As these images arrive, the Navigator redraws the display of the HTML document with the newly arrived image or images.

A problem with Internet browsers in general is that the speed of human visual response is much faster than the speed at which HTML documents can be retrieved and displayed at common modem speeds. Further, the public is accustomed to information systems, such as television channel controllers, which appear to have near instantaneous response. Browsing HTML documents from the Internet therefore appears very slow, and thus affects the quality of user experience.

The present invention is a browser and browsing method for a computer network such as the Internet which manages retrieval and display of electronic documents to enhance the perceived responsiveness of the browser to user action. According to a first aspect of the invention, the browser provides an enhanced perception of responsiveness when browsing an electronic document having a background image. The browser requests and receives the electronic document from a remote computer or computer network. If the electronic document specifies a background image, the browser also requests the background image from the remote computer or computer network. However, rather than deferring drawing a display of the electronic document until the background image is requested and received, the browser draws an initial display of the electronic document without the background image (e.g., with only the text contained in the already retrieved electronic document).

After the background image also is received, the browser then redraws the display of the electronic document including the background image.

In comparison to prior browsers which defer initially drawing the electronic document until the background image also is received, the initial drawing of the electronic document prior to receiving the background image according to this aspect of the invention creates the perception of quicker response. This is because the initial display of the document without the background image can be done sooner than a display of the document with the background image. For example, where it takes six seconds to retrieve the electronic document and an additional nine seconds to retrieve the background image, the browser according to this aspect of the invention can initially draw the electronic document without the background image after six seconds. By contrast, the prior browsers which defer drawing the document until the background image also is received cannot start drawing the document until at least fifteen seconds have elapsed (i.e., for retrieving both the electronic document and the background image).

Since the initial drawing of the document without the background image may delay a second drawing of the document with the background image, the browser according to this aspect may actually take longer to download and display the document with the background image than the prior browser. Although the total time for downloading and displaying the document with the background image may be longer, the user perceives the browser according to this aspect of the invention to be more responsive because the initial display of the document without the background image is faster than the prior browser's deferred initial display with the background image.

According to another aspect of the invention, the browser also enhances the perception of responsiveness when browsing electronic documents having images in a portion of the electronic document currently visible in a display area or frame of the browser and images in a portion of the electronic document not currently visible in the display area. In such case, the browser prioritizes the retrieval of the images depending on their location in the visible or non-visible portions of the electronic document. When requesting images, the browser defers requesting images in the current non-visible portion of the document until completing downloading of any already requested images in the current visible portion of the document. As a requested image in the current visible portion is received, the browser updates the display by redrawing the document with the received image.

The user can change the current visible portion, such as by paging or scrolling through the document. Whereupon, the browser updates the display by drawing a new current visible portion of the document including any images in the visible portion that have been received.

As a result, images which are to be incorporated into a currently visible portion of the electronic document generally are received more quickly than if all images for both visible and non-visible portions are requested concurrently (as done by the Navigator). Although the time to retrieve all images for the document remains the same, the images appear to arrive more quickly since the images which would be visible to the user arrive first. Further, since the communications bandwidth is devoted to the image or images in the currently visible portion and not also divided with images in currently non-visible portions, the images for the currently visible portion generally also arrive faster.

According to a further aspect of the invention, the browser further enhances the perception of responsiveness by dynamically managing connections with the remote computer or site at which the electronic document resides. Generally, images incorporated in an electronic document reside at a same remote site as the electronic document. The browser connects with the site using a network communications protocol. Since multiple resources (e.g., the electronic document and files incorporated therein) typically are retrieved from the same site, the browser preferably uses a persistent connection (e.g., a "keep alive" connection) which can be used to retrieve multiple resources in serial succession. If another resource is to be requested while a first resource is being received on the persistent connection (such as where two or more images are within a visible portion of the electronic document), the browser evaluates whether the expected time remaining to complete receiving the first resource would exceed the expected time needed to create an additional persistent connection to the site. If so, the browser creates the additional persistent connection and requests the second resource on the additional persistent connection. Otherwise, the browser waits for receiving the first resource on the existing persistent connection to complete and thereafter requests the second resource on the existing persistent connection.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
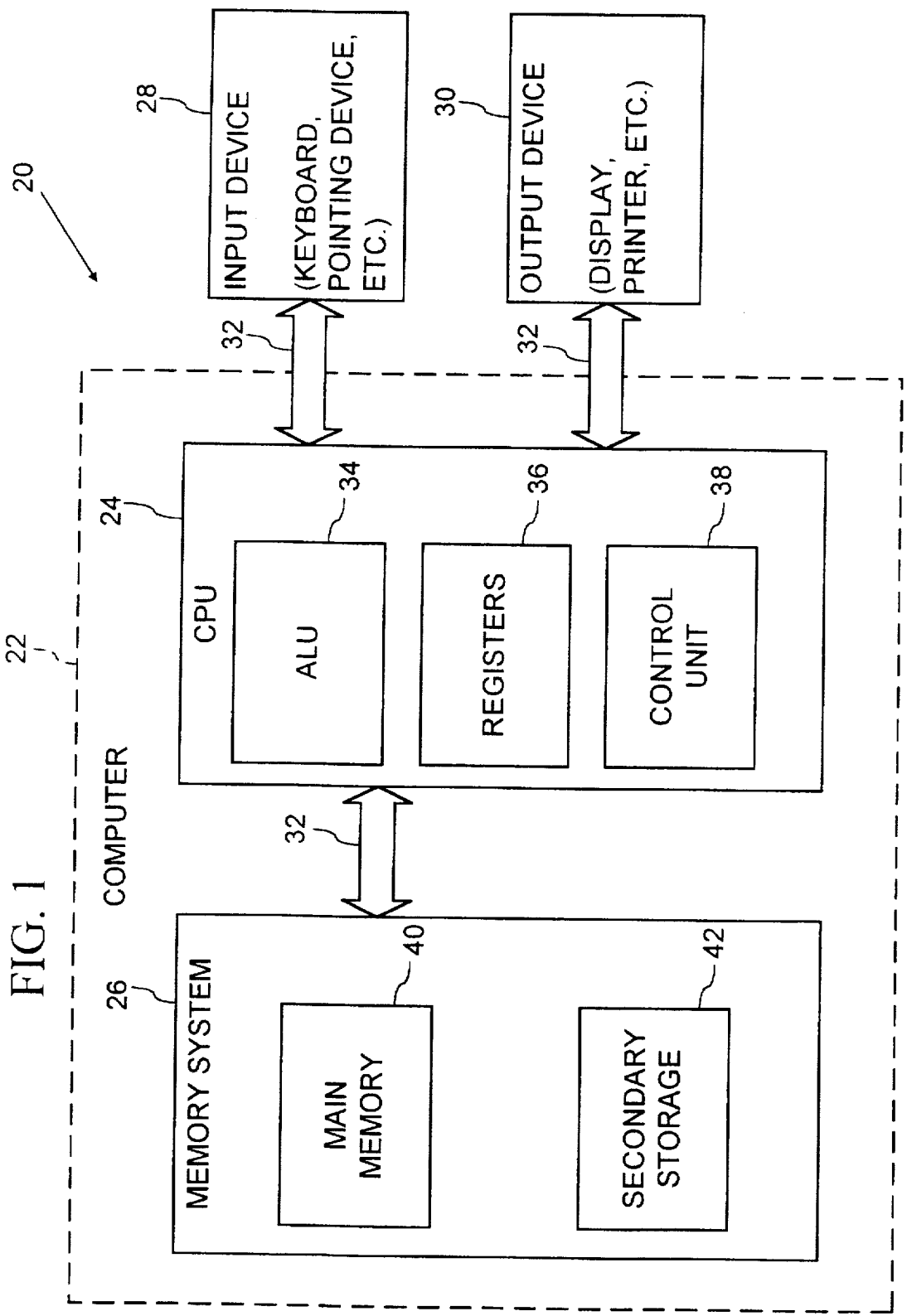
FIG. 1 is a block diagram of a computer system that may be used to implement a method and apparatus embodying the invention for enhancing the perceived responsiveness of a network browser.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26. Preferably, the operating system employs a graphical user interface where the display output of an application program is presented in a rectangular area (sometimes referred to as a "Window") on the screen of the output device 30 and is also multi-tasking (allowing application programs to execute computing tasks in multiple threads), such as Microsoft's Corporation's Windows® version 3.x, Windows® 95 or Windows® NT operating systems, IBM's OS/2 Warp operating system, Apple's Macintosh System 7 operating system, X-Windows, etc.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Browser Overview

Figure 2:
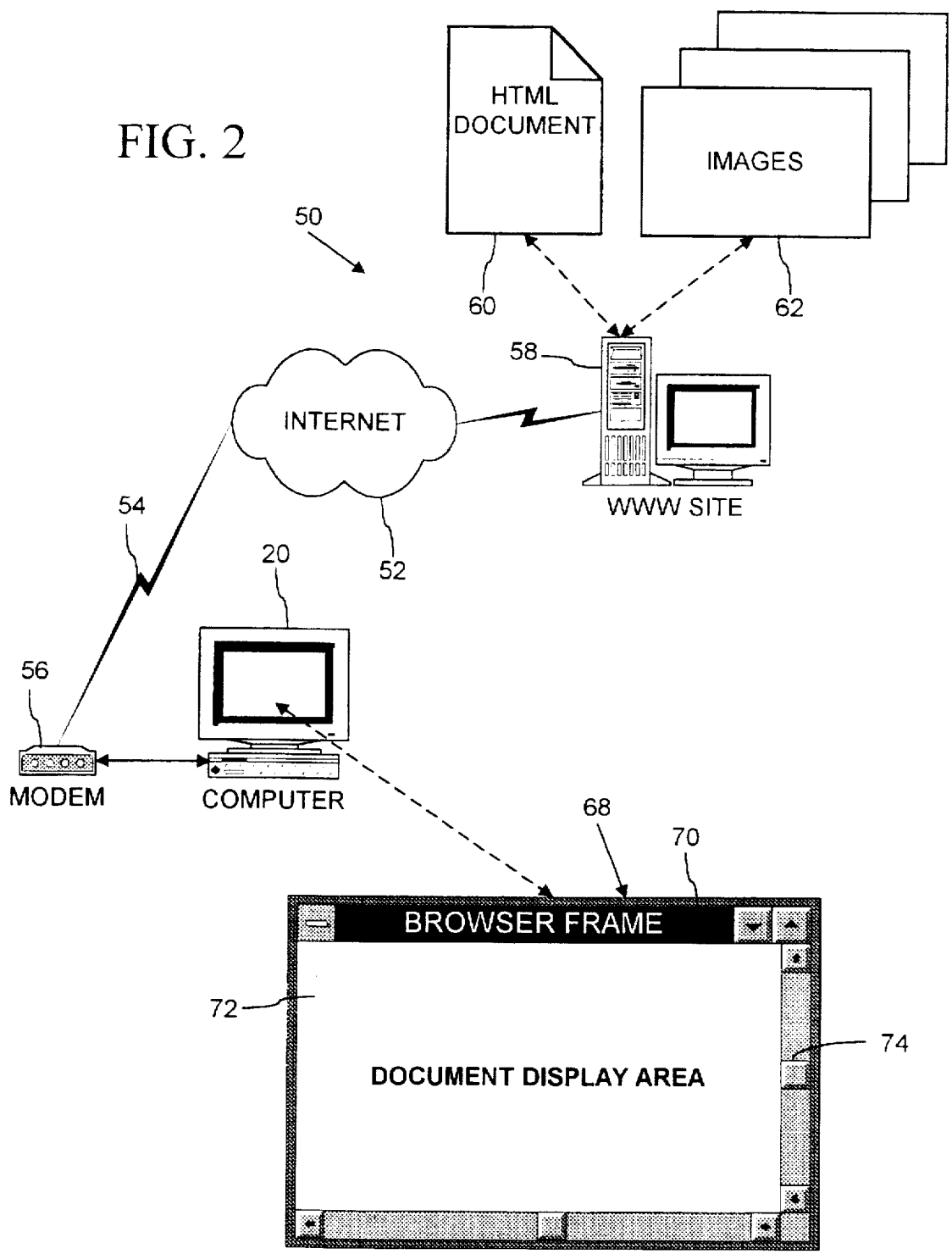
FIG. 2 is a block diagram of the computer system of FIG. 1 connected to a remote computer network (e.g., the Internet) for locally browsing electronic documents residing at a remote computer site.

In a browsing environment 50 of an illustrated embodiment of the invention shown in FIG. 2, the computer 20 (also shown in FIG. 1) runs a browser application software (hereafter "browser") for browsing electronic documents from a remote computer network 52. The illustrated remote computer network 52 is the Internet, which is described in the Background and Summary of the Invention above. In the illustrated browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN) or like computer network.

An electronic document 60 for browsing with the computer 20 resides at a remote computer 58 (also referred to as a "site") connected to the computer network 52, such as a world-wide web site on the Internet. The illustrated electronic document 60 conforms with HTML standards, and may include extensions and enhancements of HTML standards. In conformance with HTML, the electronic document 60 can incorporate other additional information content 62, such as images, audio, video, executable programs, etc. (hereafter simply "images" 62), which also reside at the remote computer 58. The electronic document 60 and images 62 preferably are stored as files in a file system of the remote computer 58. The electronic document 60 incorporates the images 62 using HTML tags that specify the location of files or other Internet resource containing the images on the Internet 52. In alternative embodiments of the invention, the electronic document 50 can have other structured document formats which permit specifying additional content, such as the images 62, which are to be incorporated into the document from separate files or resources on the computer network 52. Although described as an electronic document and generally constituting electrical signals which are electronically stored, transmitted, and processed, it should be understood that the document 60 also can be stored, transmitted, transformed and processed at the remote site 58, on the computer network 52, and at the computer 20 in magnetic, optical or other form.

In the illustrated browsing environment, the images 62 generally are of two types, background images and embedded images. A background image is presented in the electronic document in a tiled arrangement (i.e., the image is repeated and abutted edge to edge in a two-dimensional array) over which text is superimposed. For example, a document on Disney's world-wide web site incorporates a small outline of Mickey Mouse's head as a background image which is tiled in an array of approximately 20 by 40 to form a background for the document's text. The electronic document 50 incorporates a background image using the following HTML tag:

<BODY BACKGROUND="URL">text</BODY> where URL is a URL specifying the file on the Internet that contains the background image, and text is a text portion of the document which is to be superimposed over the background image.

An embedded image is inserted at a particular point in the electronic document (e.g., at a location where the HTML tag that specifies the embedded image appears in the document). The electronic document 50 incorporates an embedded image using the following HTML tag:

<IMG SRC="URL"> where URL is a URL specifying the file or resource on the Internet that contains the background image. The electronic document 50 also can include attributes with this HTML tag such as shown in the following table:

| Attribute | Explanation | Example |
| --- | --- | --- |
| ALIGN=TOP, MIDDLE, or BOTTOM | The surrounding text is aligned with the top, middle, or bottom of the image. | <IMG SRC="sample.gif" ALIGN=MIDDLE> |
| ALIGN=LEFT, or RIGHT | The image is drawn as a left-flush or right-flush "floating image," and text flows around the image. | <IMG SRC="sample.gif" ALIGN=LEFT> |
| ALT="text" | Specifies text that will be displayed in place of the image if browser's "Show Pictures" option is turned off. | <IMG SRC="sample.gif" ALT="Picture of the Taj Mahal"> |
| WIDTH=n HEIGHT=m | Specifies the size at which the image is drawn. If actual dimensions are smaller, the image is stretched to match these attributes. | <IMG SRC="sample.gif" WIDTH=320 HEIGHT=200> |
| ISMAP | Identifies the image as a server-side image map. Clicking the image transmits the coordinates of the click back to the server, triggering a jump to another page. | <A HREF="jump.map"> <IMG SRC="sample.gif" ISMAP></A> |
| SRC | Specifies the URL of the image to insert. | <IMG SRC="http://www.sample.com/test.gif"> |

The electronic document 60 can include additional HTML tags and attributes for specifying the images 62 to be incorporated into the electronic document. Any tags and attributes that are not supported by the browser are ignored. This allows the standard HTML tags and attributes to be flexibly extended. Browsers that support the HTML extensions can display the electronic document including the portion of the document using the HTML extensions. Browsers that do not support the HTML extensions also can display the electronic document except for the portion of the document using the HTML extensions.

In operation, the browser on the computer 20 retrieves electronic documents from their sites on the Internet (e.g., the electronic document 60 from the site 58) in response to user input and displays the document on the computer's screen or output device 30 (FIG. 1). The user specifies a URL of a particular document, such as by inputting a URL character string with a keyboard, by clicking a hyperlink specifying a URL in a document currently being displayed, or by selecting a URL from a list. In response to the input, the browser transmits requests on the Internet for the document 60 and its images 62 using conventional Internet communications protocols, such as the hyper-text transport protocol (HTTP), the Transmission Control Protocol (TCP) and the Internet Protocol (IP). In general, protocols are a set of rules and a prearranged data format defining how two computers communicate on the computer network 52.

The browser has a window 68 on the screen of the computer's output device 30 (FIG. 1) as is conventional for application programs in an operating system with a graphical user interface. In the window 68, the browser includes a frame 70 or border with graphical user interface controls (e.g., a menu bar, scroll bars, buttons, etc.) which surrounds a document display area 72. The user interface controls of the frame 70 can be activated by the user with the input device 28 (FIG. 1) to control the browser. The browser displays the electronic document 60 that the user is currently browsing in the document display area 72. If the electronic document is too large to completely fit within the document display area 72, the browser displays a portion of the document (referred to hereafter as the "visible portion") in the document display area 72 and presents a scroll bar 74 in the browser frame 70. The user can manipulate the scroll bar 74 with a mouse or other pointing device or input key commands on the keyboard (e.g., page up or page down) to change the visible portion of the document that is shown by the browser within the document display area 72.

In general, the browser displays the document 60 in the document display area 72 by parsing and interpreting the HTML tags in the document, then drawing the document with the formatting and any additional images or other content specified by the HTML tags. The browser draws the document by generating and writing display data (sometimes referred to as bitmaps or bit blocks) to a display buffer in the computer's memory system 26 or to a display device 30 of the computer 20.

Electronic Document With Background Image Retrieval and Display Process

Figure 3:
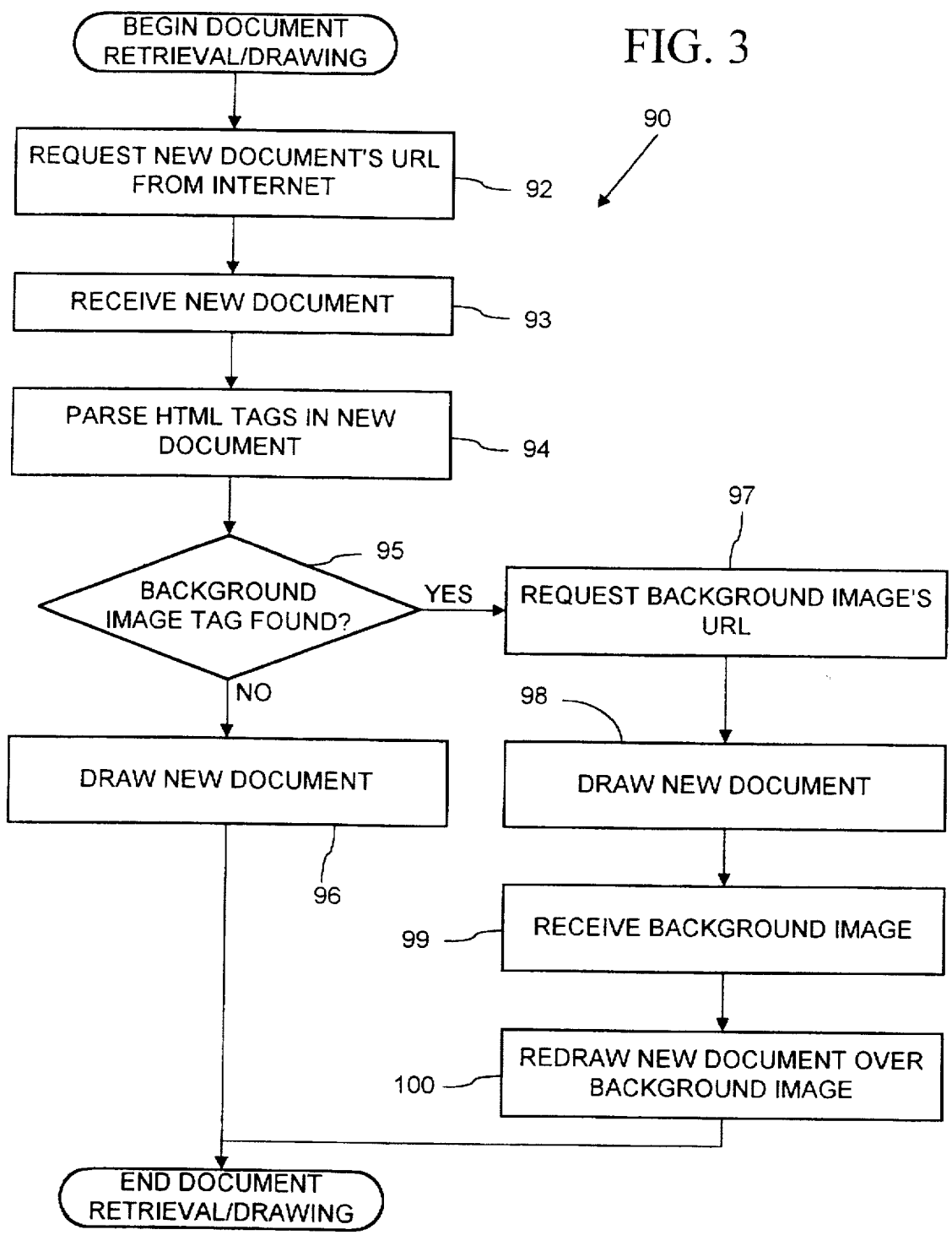
FIG. 3 is a flow chart depicting a process for retrieval and drawing of the electronic document of FIG. 2 with a background image to enhance browser responsiveness.

With reference now to FIG. 3, the browser retrieves documents in the illustrated browsing environment 50 using a document retrieval and display process 90 for enhancing perceived browser responsiveness when browsing electronic documents which incorporate a background image. Rather than defer the initial drawing of the document 60 (FIG. 2) in the document display area 72 (FIG. 2) until after the background image is received and available at the computer 20, the browser in the process 90 instead initially draws the electronic document while receipt of the background image at the computer is still pending. The initial display of the document can then take place sooner with the process 90 and therefore is perceived to be more responsive, even though the initial display of the document is without its background image.

At a step 92 of the document retrieval and drawing process 90, the browser first requests a new document 60 (FIG. 2) from its site 58 (FIG. 2) on the Internet 52 (FIG. 2). The illustrated browser requests the document by transmitting the request on the Internet using well known Internet communications protocols (e.g., HTTP, TCP/IP, etc.) and a URL for the document specifying its location on the Internet. In response to the request, the remote computer site 58 begins transmitting the document back to the computer 20 (FIG. 2), again using well known Internet communications protocols.

At a next step 93, the document 60 is received at the computer 20. The browser then begins parsing the document 60 to find and interpret HTML tags in the document at step 94. As described previously, the document generally includes HTML tags for specifying the formatting of the document, and also can include tags that specify a background image for one or more portions of the text of the document.

If no HTML tag specifying a background image is found at a step 95, the browser proceeds to draw a visible portion of the new document in the document display area 72 (FIG. 2) at a step 96 with any formatting specified by the HTML tags in the document. After drawing the document at step 96, the process 90 ends.

If however an HTML tag for a background image 62 is found in the document 60 at the step 95, it is also necessary to retrieve the background image from the remote computer site 58 (FIG. 2) in order to fully display the document. Accordingly, the browser also requests the background image on the Internet at a step 97. Generally, the background image resides at the same remote site 58 as the document 60, but alternatively can reside at a second remote site on the Internet. As with the document 60, the browser requests the background image using well known Internet communications protocols and the background image's URL (which is specified by the HTML tag in the document). The remote site where the background image resides will respond to the request by transmitting the image back to the computer 20.

While receipt of the background image 62 is still pending, the browser proceeds to draw the visible portion of the document 60 into the document display area 72 at a step 98. Since the background image is not yet received at the computer 20, the browser draws the document 60 without the background image as if the document did not contain the HTML tag specifying the background image. Since any images and like media which reside as separate resources on the Internet that are specified for incorporation into the document are not yet retrieved from the Internet, the browser generally displays only text and like media such as tables, lists, etc. that are contained within the HTML document itself at the step 98.

As shown at step 99, the computer 20 then receives the background image previously requested at step 97 from the Internet. When the background image is received and available at the computer 20, the browser redraws the visible portion of the document 60 within the document display area 72 with the background image at step 100. For the <BODY BACKGROUND="URL">text</BODY>HTML tag described above, the browser tiles the background image and superimposes the text between the tags over the tiled background image. The process 90 then ends.

In some embodiments of the invention, each of the steps of the process 90 are performed sequentially as separate synchronous functions. Alternatively, the receiving steps 93 and 99 can be performed within a separate thread of execution so that the initial drawing of the document without the background image in step 98 can be performed concurrently on the computer 20 with the receiving of the background image in step 99.

Prioritized Image Downloading Process

Figure 4A:
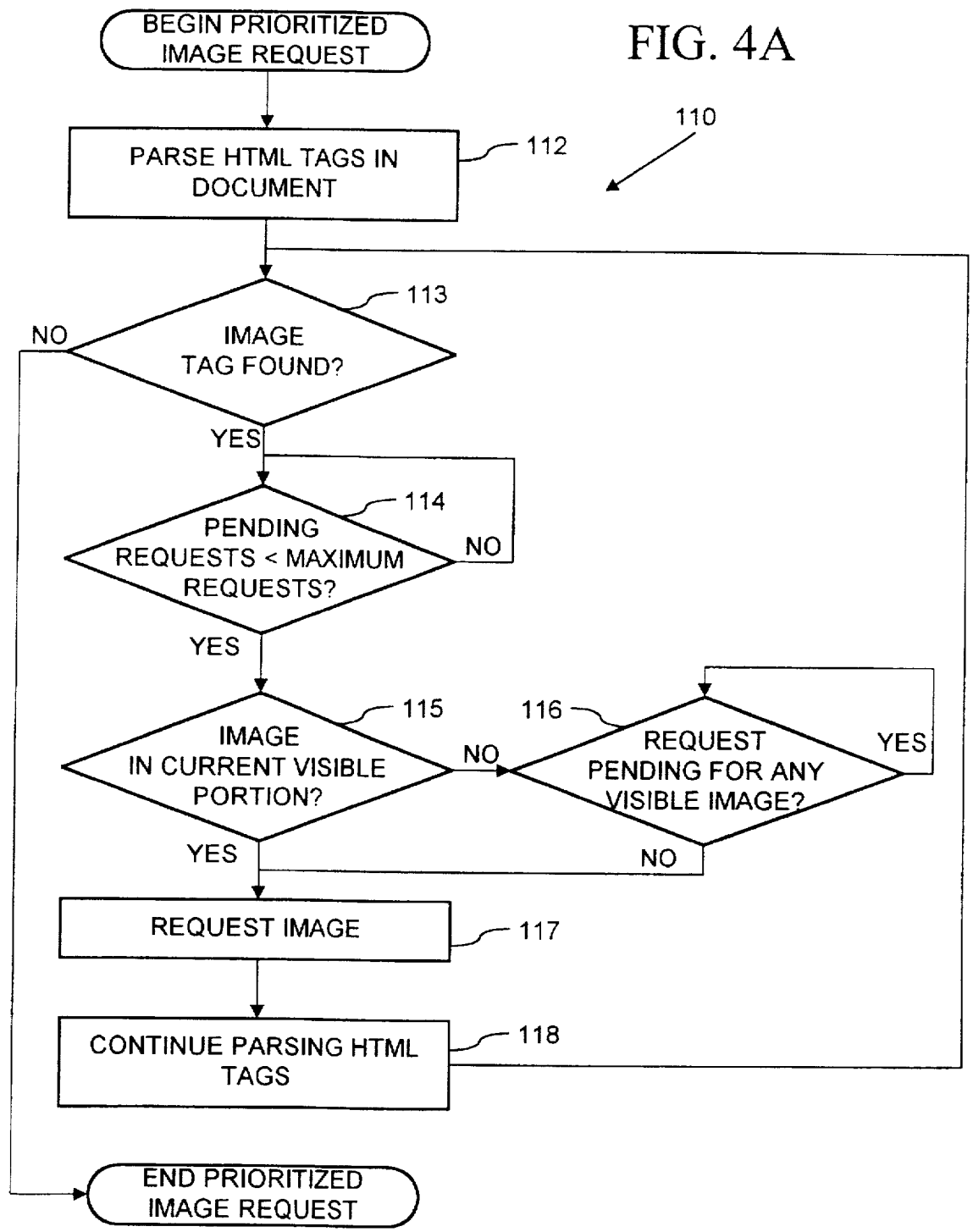
FIGS. 4A–B are a flow chart depicting a process for prioritizing embedded images in the retrieval and drawing of the electronic document of FIG. 2 according to a visible portion to enhance browser responsiveness.
Figure 4B:
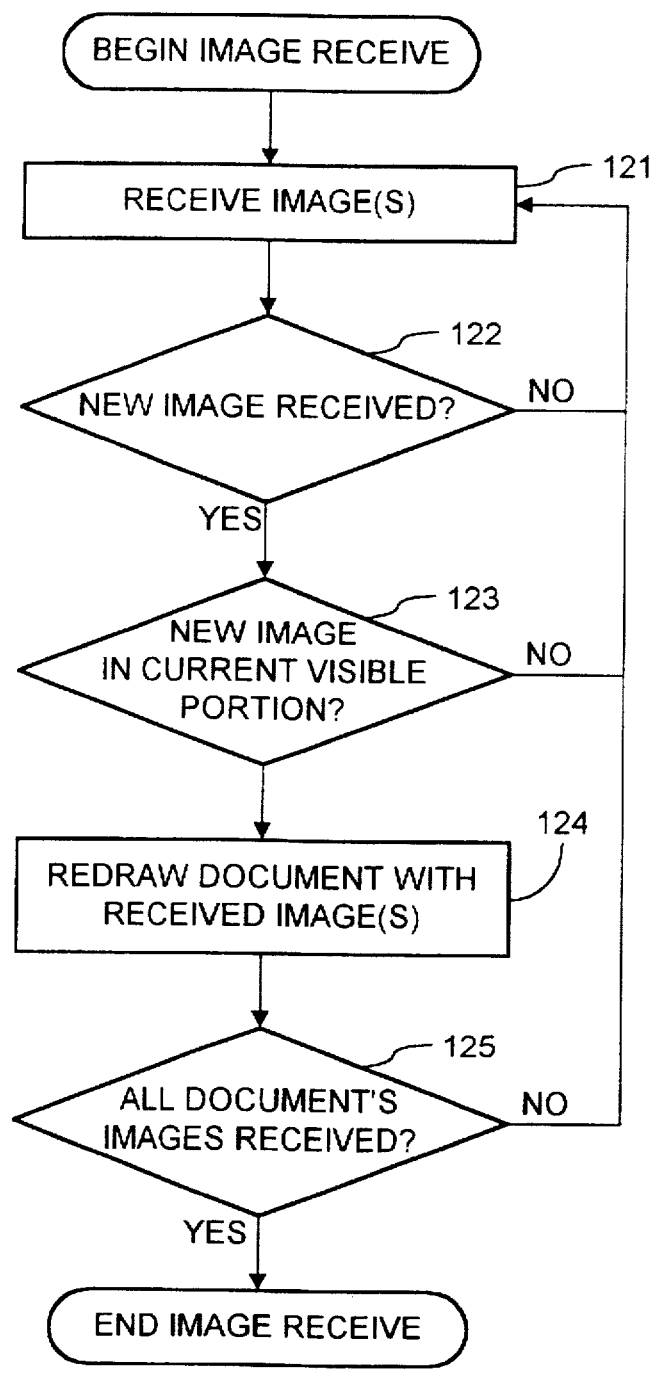

With reference now to FIGS. 4A and 4B, the browser retrieves and displays images 62 of the electronic document 60 in the illustrated browsing environment 50 using a prioritized image requesting process 110 (FIG. 4A) and an image receiving process 111 (FIG. 4B) for enhancing perceived browser responsiveness. The illustrated requesting and receiving processes 110-111 are performed concurrently in separate threads of execution. Rather than concurrently downloading the images 62 that are currently in the visible portion of the document together with those not in the visible portion, the browser in the processes 110-111 instead defers requesting images that are not currently in the visible portion until completing downloading of any previously requested images in the visible portion. The browser thus avoids sharing the communications bandwidth with additional non-visible images when downloading images in the current visible portion of the document. The images in the visible portion therefore can be downloaded more quickly, which enhances the perceived responsiveness of the browser.

The browser performs the prioritized requesting process 110 (FIG. 4A) after the electronic document 60 has been retrieved from the site 58 (FIG. 2). At a first step 112 in the process 110, the browser parses the electronic document searching for a next HTML tag for an embedded image 62 (e.g., the <IMG SRC="url">tag described above). As shown at step 113, the browser continues in a loop of steps 113-118 if an embedded image tag is encountered in the document. Otherwise, if no image tag is found in the document 60, the prioritized image requesting process 110 ends.

Within the loop 113-118, the browser first checks whether the number of pending image requests is less than a maximum number of concurrent image requests for the process. A request for one of the images 62 is pending if the browser has requested the image (i.e., at the step 117 of the process 110), but the receiving process has not yet completed downloading the requested image. In the illustrated process 110, the maximum number of concurrent image requests is a predetermined constant, such as the number eight. Alternatively, the maximum number of concurrent image requests can be a variable which is set at the user's option. If the number of pending image requests is less than the maximum number of concurrent image requests, then the browser continues to the next step 115. Otherwise, the browser waits for the receiving process to complete downloading of an image for a pending image request to reduce the number of pending requests to less than the maximum number of concurrent image requests before continuing to the step 115.

At the step 115, the browser next checks whether the image specified by the tag is to be incorporated into the visible portion of the document 60 which is currently displayed within the document display area 72 (FIG. 2). If the image is not within the current visible portion, the browser also checks at the step 116 whether there is a pending request for any image that is within the visible portion of the document. If there are such pending requests, the browser waits for all pending requests for images to be incorporated within the visible portion to be completed. Otherwise, if the image specified by the tag is within the visible portion at step 115 or there are no requests pending for any visible images at step 116, the browser proceeds to request the image specified by the tag at step 117. Since the browser waits for pending requests for visible images to complete before requesting an image not in the visible portion of the document, the browser avoids sharing the communications bandwidth of the computer's connection to the Internet for downloading another non-visible visible image and thereby slowing the downloading of any images for the visible portion of the document.

As shown at the steps 118 and 113, the browser then continues parsing the document 60 searching for a next HTML tag that incorporates a visible image. If the document contains another such tag, the browser repeats the loop 113-118 for that tag. Otherwise, if the document does not contain any other tags for incorporating images into the document, the process 110 ends.

Referring now to FIG. 4B, the browser performs the image receiving process 111 (FIG. 4B) in a separate thread of execution concurrently with the prioritized image requesting process 110 (FIG. 4A). At a first step 121 in the image receiving process 111, the browser receives the data for any images that have been requested in the prioritized image requesting process 110. For receiving the images over the Internet 52 (FIG. 2), the browser utilizes conventional Internet communications protocols (i.e., HTTP, TCP/IP, etc.).

When the browser completes receiving a new image as shown at a step 122, the browser checks at a step 123 whether the new image is within the currently visible portion of the document that is displayed within the document display area 72 (FIG. 2). If the browser has not yet completed receiving an image at the step 122 or the new image which has been completely received is not within the visible portion at the step 123, the browser continues receiving data for the pending image requests at the step 121. If a new image is received which is within the currently visible portion of the document, the browser redraws the visible portion of the document 60 within the document display area 72 at a step 124, including the newly received image.

At a step 125, the browser checks whether all images 62 (FIG. 2) of the document 60 have been retrieved from the site 58 (FIG. 2). The browser has completed retrieving all the images 62 when the prioritized image requesting process 110 has completed, and the image receiving process 111 has completed receiving the images for all pending image requests. If all the images have not yet been retrieved, the browser returns to receiving any requested images at the step 121. Otherwise, the image receiving process ends.

Persistent Connection Management Process for Requesting Images

Figure 5:
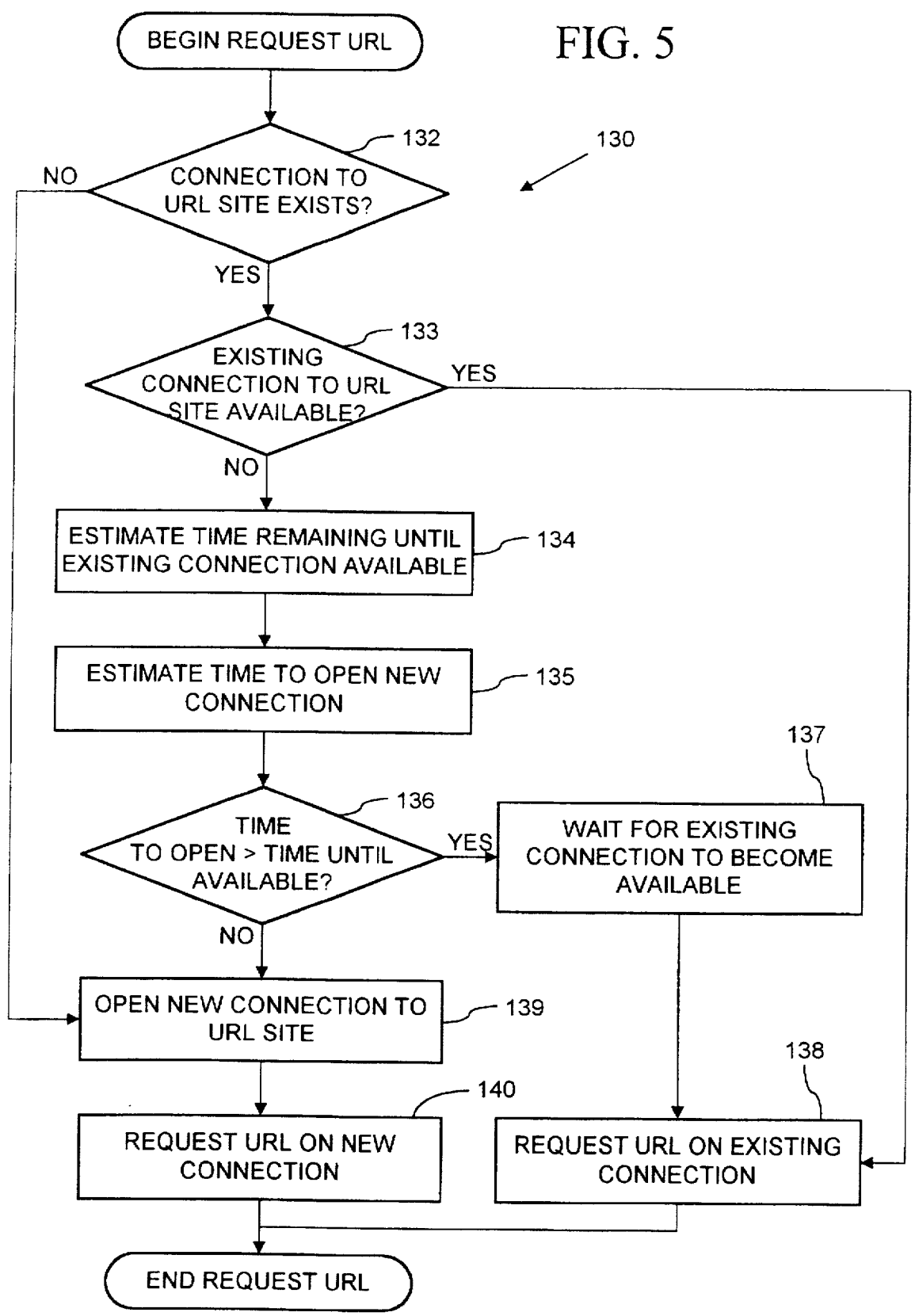
FIG. 5 is a flow chart depicting a process for managing connections to the remote computer site for retrieving the electronic document of FIG. 2 to enhance browser responsiveness.

With reference to FIG. 5, the browser in the illustrated browsing environment 50 (FIG. 2) dynamically manages persistent ("keep alive") connections to the remote site 58 on the Internet for requesting and downloading the images 62 with a connection management process 130. When retrieving the electronic document 60 from the remote site 58 for display at the computer 20 (FIG. 2), the browser creates a persistent connection (sometimes referred to as a "keep alive" connection) with the remote site 58 as is conventional for the HTTP protocol (version 1.1). As defined in the HTTP protocol, a connection is a virtual circuit established between two programs (e.g., the browser on the computer 20 and a server program on the remote site 58) for the purpose of communication. The circuit is formed on the Internet 52 by chaining proxies, gateways, and tunnels (which are types of intermediary programs at intermediary computer sites on the Internet) that relay requests and responses through the Internet between the browser on the computer 20 and the server process on the remote site 58. To retrieve a resource (e.g., the document 60 and images 62) from the remote site 58 with the HTTP protocol, the browser first creates a connection to the remote site 58 and can then request the resource from the remote site (and receive the resource from the remote site in response).

A persistent connection allows the browser to maintain a connection previously created with the remote site 58 after a single request/response transaction (i.e., for retrieving a single resource from the remote site 58) has been completed, so as to be able to retrieve additional resources on the same connection without having to create a separate connection to the remote site 58 for each resource being retrieved. Since creating a connection with the remote site takes some time (typically 1-2 or more seconds), using a persistent connection to request multiple resources in succession can reduce the total time to retrieve the resources. However, only one resource can be retrieved at a time. Thus, the browser must wait until a resource previously requested on a persistent connection is received before another resource can be requested on the same connection.

With the connection management process 130, the browser dynamically creates new persistent connections to the remote site 58 when doing so likely avoids the delay of waiting to request one of the images 62 on an existing persistent connection which is currently in use by the browser for receiving a previously requested image. Where the existing persistent connection is likely to be available quicker, the browser requests the image on the existing persistent connection. Otherwise, the browser creates another persistent connection and requests the image on that persistent connection.

The browser performs the connection management process 130 each time that it is necessary to retrieve a new resource from the remote site 58 where the resource resides on the Internet 52. For example, the browser performs the connection management process 130 each time that it requests one of the images 62 which is to be incorporated into the electronic document 60 at the step 117 of the prioritized image requesting process 110 of FIG. 4A.

At a first step 132 of the connection management process 130, the browser checks whether any persistent connection exists to the remote site 58 specified by the new resource's URL. In the case of the images 62, the images 62 and the document 60 reside at the same site the image's URL therefore specifies the same remote site 58 from which the electronic document was just received. The persistent connection to the remote site 58 that the browser created to retrieve the electronic document therefore usually still exists when the images 62 are to be retrieved. If a persistent connection with the remote site specified by the resource's URL exists, the process 130 proceeds to a next step 133. Otherwise, if no persistent connection to the remote site exists, the process jumps ahead to a step 139 where the browser opens a new persistent connection to the remote site for requesting the resource.

At the next step 133, the browser then checks whether any existing persistent connection to the remote site 58 is available. A connection is available if it is not currently in use for retrieving a previously requested resource. A persistent connection may already be available at the step 133 if it was created to retrieve a previously requested resource and downloading of that resource has already completed. Since the connection is persistent, the connection will remain open and available for the browser to request additional resources as is conventional to the HTTP protocol and described above (unless the remote site determines to terminate the connection because a time limit since the last download completed has been exceeded or a maximum number of request/response transactions is met). For example, the persistent connection on which the browser retrieved the document 60 will usually be available when the browser requests the first of the images 62 to be incorporated into the document 60, but often is still downloading the first image when the browser requests a second image. If no existing persistent connection is available at the step 133, the process 133 proceeds to a next step 134. Otherwise, if a persistent connection is available, the process 133 jumps ahead to a step 138 where the browser requests the resource on that connection.

At the steps 134-135, the browser estimates the time remaining until an existing persistent connection is available and the time for creating a new persistent connection to the remote site 58. The browser then compares these times at a step 136. Preferably, the browser bases the estimates on the most recent historic time or times for creating a connection to the remote site 58 and for downloading a resource from the remote site on a connection. Specifically, the browser times creating each persistent connection to the remote site 58 (e.g., when creating a new connection at the step 139) and records this time. The browser then bases its estimate of the time for creating a new persistent connection to the remote site on the historic time taken to create a connection to the remote site (i.e., the time taken to create the existing persistent connection to the remote site). Since the time for creating a connection vary by the particular remote site on the Internet and by the current load of the remote site and the Internet, the browser preferably bases the estimate on the historic time or times for creating the most recent and preferably still existing persistent connections to the same remote site. For example, the browser's estimate can equal the time for the most recently created persistent connection to the remote site. Alternatively, where multiple recent connections have been created, the estimate can equal an average of the times for the recent connections.

The browser bases the estimate of the time until the existing persistent connection (or connections) to the remote site will be available on the historic time for downloading resources on the connection from the remote site. Specifically, the browser times downloading of resources on the existing persistent connection and records the time. The browser then subtracts the elapsed time for downloading a pending request on the persistent connection from this historic time for downloading a resource on the existing persistent connection. If multiple resources already have been downloaded on the existing persistent connection or on multiple recently created persistent connections to the same site, these download times can be averaged to obtain the estimate. Further, if the size of the resources being downloaded is known, the estimate also can be based on the historic download rate of recently created persistent connections to the remote site.

If the browser estimates at the step 136 that creating a new persistent connection to the remote site will take longer than the time until an existing persistent connection is available, then the browser waits for the existing connection to become available at a step 137 and requests the resource on the existing connection at the step 138. Otherwise, if creating a new persistent connection is estimated to take less time, the browser then proceeds to create the new persistent connection to the remote site at the step 139 and request the resource on the new persistent connection at a step 140. Thus, the browser is able to dynamically either use an existing persistent connection to avoid the delay of creating new connections or create and use a new persistent connection to avoid waiting to use the existing persistent connection when requesting a new resource, depending on which is likely to be quicker. As a result, the browser is able to more quickly request additional resources, such as the images 62 for the document 60, from the remote site 58.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

Further, although illustrated in the context of retrieving images for an electronic document from a remote computer, it should be understood that the invention applies equally well to retrieving other types of resources that are incorporated into electronic documents, including but not limited to audio, video, three-dimensional images, animations, and executable programs.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of remotely browsing an electronic document residing at a remote site on a computer network and specifying a background image which is to be displayed with the electronic document superimposed thereon comprising in response to a user's request to browse to the electronic document:

requesting the electronic document from the remote site on the computer network;

receiving the electronic document from the remote site;

requesting the background image specified in the electronic document from the remote site on the computer network;

receiving the background image from the remote site;

drawing an initial display of the electronic document without the background image prior to receiving the background image from the remote site; and redrawing the electronic document superimposed over the background image after receiving the background image from the remote site;

whereby the initial display of the electronic document is not delayed until the background image is received from the remote site.

2. The method of claim 1 where the electronic document also specifies embedded images which also reside at the remote site, the method further comprising:

prioritizing the images according to whether the images are visible in a current display of the electronic document; and requesting the images based on their priority.

3. The method of claim 2 further comprising:

for each of the embedded images, requesting the embedded image from the remote site and receiving the embedded image from the remote site; and where an embedded image is not within a currently visible portion of the electronic document and any embedded image within the currently visible portion of the electronic document has been requested but not yet received, delaying the requesting of the embedded image until after said any embedded image within the currently visible portion of the electronic document has been received.

4. The method of claim 1 wherein the electronic document also specifies embedded images also residing at the remote site, some of the embedded images for incorporating into a currently visible portion of the electronic document, and some of the embedded image for incorporating into a not currently visible portion of the electronic document, the method further comprising:

requesting each of the embedded images from the remote site according to an ordering of the embedded images;

receiving each of the embedded images from the remote site; and delaying the requesting of any of said some of the embedded images for incorporating into the not currently visible portion of the document when at least one of said embedded images for incorporating into the currently visible portion of the electronic document is requested but not yet received from the remote site.

5. A browser for retrieving an electronic document residing at a remote site on a computer network, the electronic document having a tag for specifying a background image which is to be displayed with the electronic document superimposed thereon, comprising:

a computer networking processor for creating a connection to the remote site, requesting the electronic document from the remote site, and receiving the electronic document from the remote site, all responsive to a user's request to browse the electronic document, and for also requesting and receiving the background image from the remote site;

a parser for parsing the tag from the electronic document and causing the computer networking processor to request and receive the background image from the remote site; and a document display processor for drawing the document in a display area on the computer, the document display processor drawing an initial display of the electronic document without the background image after receiving the electronic document from the remote site and before receiving the background image from the remote site by the computer networking processor, the document display processor drawing a subsequent display of the electronic document superimposed over the background image after receiving the background image by the computer networking processor from the remote site.

6. A browser for retrieving an electronic document residing at a remote site on a computer network, the electronic document having tags for specifying embedded images also residing at the remote site for incorporating into the electronic document, comprising:

a computer networking processor for creating a connection to the remote site, requesting the electronic document and the embedded images from the remote site, and receiving the electronic document and the embedded images from the remote site;

a parser for parsing the tags from the electronic document;

a document display processor for drawing a visible portion of the electronic document in a display area on the computer; and an embedded image processor for determining whether the embedded images specified by the parsed tags are within the visible portion, and for prioritizing requesting each of the embedded images by the computer networking processor according to whether said embedded image is within the visible portion.

7. The browser of claim 6 comprising:

the embedded image processor further delaying the requesting of said embedded image by the computer networking processor from the remote site when said embedded image is not within the visible portion and when the computer networking processor is receiving any of the embedded images which are within the visible portion.

8. A browser for retrieving resources for an electronic document residing at a remote site on a computer network, comprising:

a computer networking processor for creating a persistent connection to the remote site, requesting the resources from the remote site, and receiving the resources from the remote site all with a networking protocol;

a document parser for determining resources to retrieve from the remote site for the document; and a connection manager for causing the computer networking processor to dynamically create a new persistent connection to the remote site for retrieving one of the resources from the remote site when that resource likely can be requested more quickly on the new persistent connection than on an existing persistent connection to the remote site.

9. The browser of claim 8 comprising:

a first estimator for estimating a time for creating the new persistent connection to the remote site;

a second estimator for estimating a time until the existing persistent connection is available;

a comparator for comparing the estimated time for creating the new persistent connection with the estimated time until the existing persistent connection is available; and the connection manager being responsive to the comparator for causing the computer networking processor to create the new persistent connection to the remote site if the estimated time until the existing persistent connection is available is greater than the estimated time to create the new persistent connection.

10. A method of remotely browsing an electronic document residing at a remote site on a computer network and specifying resources also residing at the remote site for incorporating into the electronic document, comprising:

requesting the electronic document from the remote site on the computer network;

receiving the electronic document from the remote site;

drawing a display of a visible portion of the electronic document;

prioritizing the resources specified by the electronic document with a priority according to whether the resources are for incorporating into the visible portion of the electronic document; and requesting the resources from the remote site based on the priority.

11. The method of claim 10 further comprising:

where the document specifies a resource for incorporating into the electronic document other than within the visible portion and at least one other resource for incorporating into the visible portion is requested but not yet received, delaying to request said resource until said at least one other resource is received.

12. The method of claim 10 wherein the document contains tags for specifying the resources, the method further comprising repeating for each of the tags in the electronic document the steps of:

parsing the tag from the electronic document;

detecting whether the resource specified by the tag is for incorporating into the visible portion;

detecting whether a previous request is still pending for a resource which is for incorporating into the visible portion;

where the resource specified by the tag is not for incorporating into the visible portion and the previous request is still pending, requesting the resource specified by the tag after the previous request is no longer pending.

13. The method of claim 10 further comprising:

creating a first persistent connection to the remote site for retrieving the electronic document and the resources from the remote site;

when requesting a resource from the remote site, estimating a first time for creating a second connection to the remote site and estimating a second time for the first persistent connection to be available;

requesting the resource on the first persistent connection if the first estimated time is greater than the second estimated time; and creating the second connection to the remote site and requesting the resource on the second connection if the first estimated time is less than the second estimated time.

14. The method of claim 10 wherein the resources comprise images.

15. The method of claim 10 wherein the resources comprise at least some of a group consisting of images, audio, video, and computer executable programs.

16. A method of remotely browsing resources residing at a remote site on a computer network, comprising:

creating a persistent connection to the remote site with a networking protocol;

requesting a first resource on the persistent connection with the networking protocol;

receiving the first resource on the persistent connection with the networking protocol;

dynamically creating a second connection to the remote site with the networking protocol for requesting a second resource when requesting the second resource on the second connection is likely to avoid a delay until the persistent connection is available.

17. The method of claim 16 comprising:

estimating a time for creating the second connection;

estimating a time for the persistent connection to be available;

creating the second connection if the estimated time for creating the second connection is less than the estimated time for the persistent connection to be available.

18. The method of claim 17 comprising:

timing the creation of a previous connection to the remote site; and estimating the time for creating the second connection based on the time for creating the previous connection.

19. The method of claim 17 comprising:

timing the retrieval of a previous resource on the persistent connection;

timing the elapsed time for retrieving a current resource on the persistent connection; and estimating the time for the persistent connection to be available based on the time for retrieval of the previous resource and the elapsed time for retrieving the current resource.

* * * * *

UNITED STATES PATENT AND TRADEMARK OFFICE
CERTIFICATE OF CORRECTION

PATENT NO.   : 5,778,372

DATED        : July 7, 1998

INVENTOR(S)  : Cordell et al.

It is certified that error appears in the above-identified patent and that said Letters Patent is hereby corrected as shown below:

| Col./Line | Reads | Should Read |
|---|---|---|
| 1/41 | on he Internet | on the Internet |
| 1/52 | Ti | T1 |
| 10/58 | non-visible visible | non-visible |
| 14/22 | thereon comprising | thereon, comprising |

Signed and Sealed this

Seventh Day of March, 2000

Attest:

Attesting Officer

Q. TODD DICKINSON

Commissioner of Patents and Trademarks